US011792503B2

(12) United States Patent
Abe et al.

(10) Patent No.: US 11,792,503 B2
(45) Date of Patent: Oct. 17, 2023

(54) IMAGING APPARATUS

(71) Applicant: Panasonic Intellectual Property Management Co., Ltd., Osaka (JP)

(72) Inventors: Kazuya Abe, Osaka (JP); Yuichi Suzuki, Osaka (JP); Kyosuke Osuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 34 days.

(21) Appl. No.: 17/727,144

(22) Filed: Apr. 22, 2022

(65) Prior Publication Data
US 2022/0345640 A1 Oct. 27, 2022

(30) Foreign Application Priority Data
Apr. 27, 2021 (JP) ................. 2021-075150

(51) Int. Cl.
*H04N 23/63* (2023.01)
*H04N 5/77* (2006.01)

(52) U.S. Cl.
CPC .......... *H04N 23/633* (2023.01); *H04N 5/772* (2013.01); *H04N 23/631* (2023.01)

(58) Field of Classification Search
CPC .. H04N 23/633; H04N 23/631; H04N 23/634; H04N 5/772; H04N 5/80; H04N 1/0048; H04N 1/21; H04N 1/2158; H04N 1/00814; H04N 1/00148; H04N 1/00172; H04N 1/00824; H04N 1/00925; H04N 1/2125; H04N 1/2129; H04N 17/002; H04N 2201/0084; G06F 11/3051; G06F 11/3058; G06F 11/3034; G06F 3/0679; G06F 3/0617; G06F 3/0658; G06F 12/16; G01K 13/00; G01K 1/026; G01K 1/024
USPC ....................................... 348/231.1
See application file for complete search history.

(56) References Cited

U.S. PATENT DOCUMENTS

| | | | | |
|---|---|---|---|---|
| 8,447,161 | B2 * | 5/2013 | Okazaki | G03B 17/55 |
| | | | | 348/333.01 |
| 8,666,221 | B2 * | 3/2014 | Okazaki | H04N 5/772 |
| | | | | 386/227 |
| 10,127,942 | B2 * | 11/2018 | Yoneda | G11B 19/26 |
| 10,834,325 | B2 * | 11/2020 | Omori | G06F 11/3034 |
| 10,992,869 | B2 * | 4/2021 | Takahashi | H04N 23/633 |
| 11,195,558 | B2 * | 12/2021 | Ueno | H04N 1/00148 |

(Continued)

FOREIGN PATENT DOCUMENTS

| | | |
|---|---|---|
| JP | 10-210449 A | 8/1998 |
| JP | 11-313278 A | 11/1999 |

(Continued)

*Primary Examiner* — Pritham D Prabhakher
(74) *Attorney, Agent, or Firm* — Renner, Otto, Boisselle & Sklar, LLP

(57) ABSTRACT

An imaging apparatus includes: an image sensor that captures a subject image to generate image data; a recorder that records the image data into a recording medium; a controller that controls a moving image shooting operation in which the image data indicating a moving image based on a result of imaging by the image sensor is recorded into the recording medium by the recorder; and a display interface that enables to display a measured value of at least one parameter sequentially for each measurement time, the parameter indicating a factor that hinders the moving image shooting operation.

9 Claims, 8 Drawing Sheets

(56) References Cited

U.S. PATENT DOCUMENTS

| | | | |
|---|---|---|---|
| 2010/0023678 A1* | 1/2010 | Nakanishi | G11C 16/102 327/512 |
| 2010/0082890 A1* | 4/2010 | Heo | G06F 12/0246 711/E12.001 |
| 2012/0050551 A1* | 3/2012 | Ishibashi | H04N 21/43635 348/208.1 |
| 2012/0189264 A1* | 7/2012 | Okazaki | H04N 23/633 386/E5.069 |
| 2012/0189265 A1* | 7/2012 | Okazaki | H04N 5/772 386/E5.069 |
| 2016/0085290 A1* | 3/2016 | Skandakumaran | G06F 1/3268 713/320 |
| 2019/0037145 A1 | 1/2019 | Omori | |
| 2020/0267325 A1* | 8/2020 | Takahashi | H04N 23/633 |
| 2020/0342913 A1* | 10/2020 | Ueno | H04N 1/00148 |
| 2022/0006922 A1* | 1/2022 | Bathija | H04N 23/661 |

FOREIGN PATENT DOCUMENTS

| | | |
|---|---|---|
| JP | 2002-135636 A | 5/2002 |
| JP | 2004-289307 A | 10/2004 |
| JP | 2004-356734 A | 12/2004 |
| JP | 2006-325148 A | 11/2006 |
| JP | 2017-184141 A | 10/2017 |

* cited by examiner

IMAGING APPARATUS

BACKGROUND

1. Technical Field

The present disclosure relates to an imaging apparatus that performs a moving image shooting operation or the like.

2. Related Art

JP 2006-325148 A discloses an imaging apparatus that records a still image during shooting a moving image. The imaging apparatus includes a data storage that temporarily holds shot image data, and a display that displays how the data storage is used when it is detected that a data writing speed is lower than a predetermined value during shooting a moving image. That is, the imaging apparatus displays how the shared storage area is used, only in a situation where a speed of writing to a recording medium is slow and a storage area shared for recording a moving image and for recording a still image during shooting a moving image is likely to be consumed. As a result, Unexamined Japanese Patent Publication No. 2006-325148 achieves the purpose of notifying the user how the shared storage area is used, in an understandable manner.

SUMMARY

The present disclosure provides an imaging apparatus capable of facilitating for a user to check a factor that may hinder shooting of a moving image.

An imaging apparatus in the present disclosure includes: an image sensor that captures a subject image to generate image data; a recorder that records the image data into a recording medium; a controller that controls a moving image shooting operation in which the image data indicating a moving image based on a result of imaging by the image sensor is recorded into the recording medium by the recorder; and a display interface that enables to display a measured value of at least one parameter sequentially for each measurement time, the parameter indicating a factor that hinders the moving image shooting operation.

The present disclosure can provide the imaging apparatus capable of facilitating for a user to check the factor that may hinder capturing of a moving image.

DETAILED DESCRIPTION

Hereinafter, embodiments will be described in detail with reference to the drawings as appropriate. However, unnecessarily detailed description may be omitted. For example, detailed description of already well-known matters and repeated description of substantially the same configuration may be omitted. This is to prevent the following description from being unnecessarily redundant and to allow a person skilled in the art to easily understand the present disclosure. Note that the applicant provides the accompanying drawings and the following description in order for a person skilled in the art to fully understand the present disclosure, and does not intend to limit subject matters recited in the claims.

First Embodiment

In the first embodiment, as an example of an imaging apparatus according to the present disclosure, a digital camera to which a memory card can be attached will be described.

1. Configuration

A configuration of a digital camera according to the first embodiment will be described with reference to FIG. 1.

Figure 1:
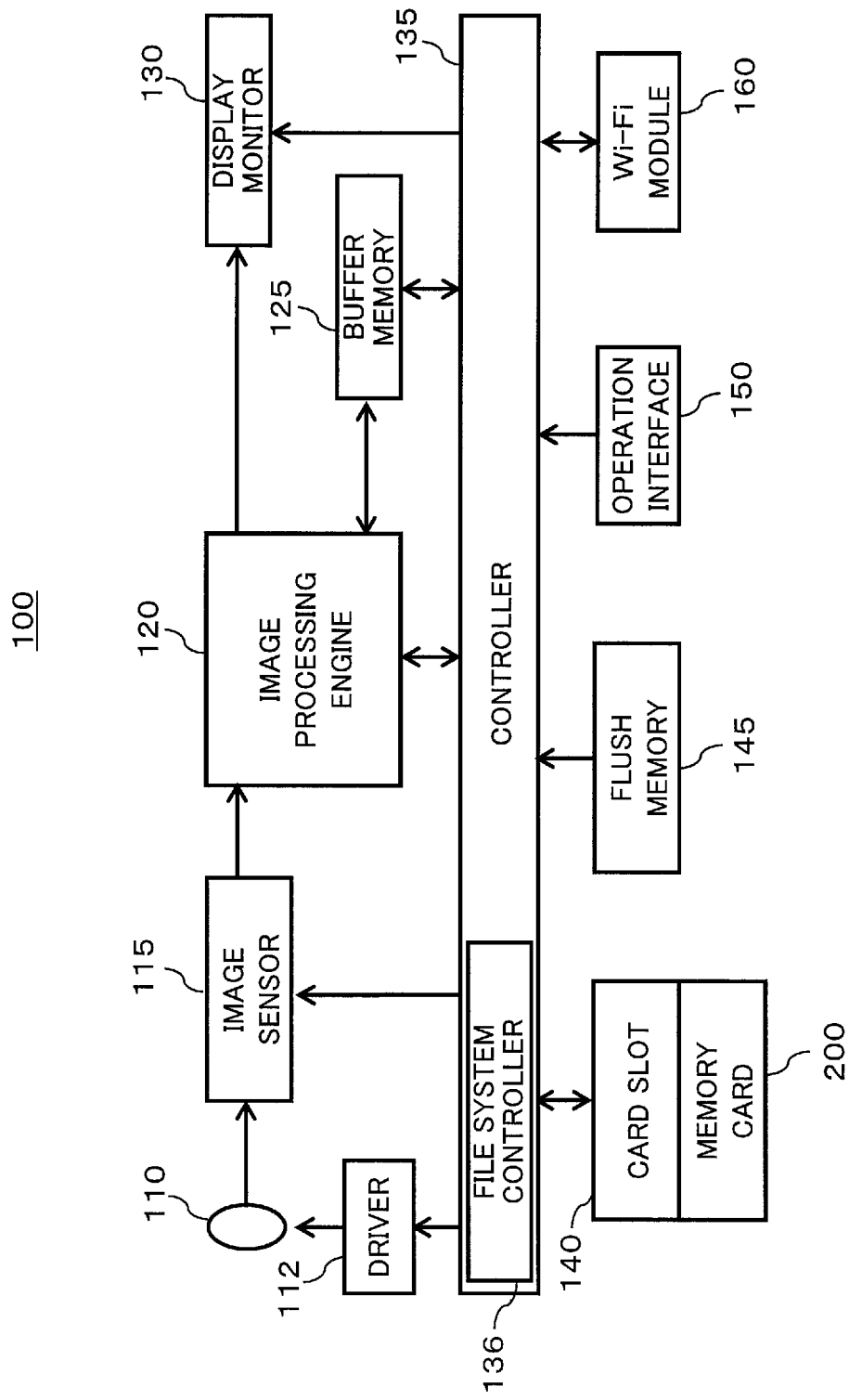
FIG. 1 is a diagram illustrating a configuration of a digital camera according to a first embodiment of the present disclosure.

FIG. 1 is a diagram showing a configuration of a digital camera 100 according to the present embodiment. The digital camera 100 of the present embodiment includes an image sensor 115, an image processing engine 120, a display monitor 130, and a controller 135. The digital camera 100 further includes a buffer memory 125, a card slot 140, a flash memory 145, an operation interface 150, and a Wi-Fi module 160. For example, the digital camera 100 further includes an optical system 110 and a driver 112.

The optical system 110 includes a focus lens, a zoom lens, an optical image stabilization (OIS) lens, an aperture diaphragm, a shutter, and the like. The focus lens is a lens for changing a focusing state of a subject image formed on the image sensor 115. The zoom lens is a lens for changing a magnification ratio of a subject image formed by the optical system. The focus lens and the other lenses are each configured with one or more lenses.

The driver 112 drives the various lenses in the optical system 110, the aperture diaphragm, and the shutter. The driver 112 includes a DC motor, a stepping motor, a servomotor, an ultrasonic motor, or the like.

The image sensor 115 captures a subject image formed via the optical system 110 to generate image-capturing data. The image-capturing data is image data indicating a captured image by the image sensor 115. For example, the image sensor 115 generates image data of new frames at a predetermined frame rate (e.g., 30 frames/second). The controller 135 controls a timing of generation of image-capturing data by the image sensor 115 and operation of an electronic shutter. As the image sensor 115, it is possible to use various image sensors such as a complementary metal-oxide semiconductor (CMOS) image sensor, a charge-coupled device (CCD) image sensor, and an negative-channel metal oxide semiconductor (NMOS) image sensor.

The image sensor 115 performs an image capturing operation of a still image, an image capturing operation of a through image, and the like. The through image is mainly a moving image and is displayed on the display monitor 130 for a user to determine a composition for image capturing of a still image. The through image and the still image are each an example of a captured image in the present embodiment. The image sensor 115 is an example of an image sensor of the present embodiment.

The image processing engine 120 performs various processes on the image-capturing data output from the image sensor 115 to generate image data, and performs various processing on the image data to generate an image to be displayed on the display monitor 130. Examples of the various processes include a YC conversion process, white balance correction, gamma correction, an electronic zoom process, a compression process, and a decompression process, but the processes are not limited to these examples. The image processing engine 120 may be configured with a hard-wired electronic circuit, may be configured with a microcomputer or a processor using a program, or may be configured with other elements. The image processing engine 120 is an example of an image processor of the present embodiment.

The display monitor 130 is an example of a display interface to display various information. For example, the display monitor 130 displays an image (through image) indicated by image data that is captured by the image sensor 115 and is subjected to image processing of the image processing engine 120. The display monitor 130 further displays a menu screen or the like for a user to set various settings of the digital camera 100. The display monitor 130 can be configured with, for example, a liquid crystal display device or an organic electroluminescence (EL) device.

The operation interface 150 is a generic term for various user interfaces that receive an operation (instruction) from a user. The operation interface 150 includes, e.g., a physical button, a lever, a dial, a touch panel, and a switch. The operation interface 150 also includes a virtual button and an icon displayed on the display monitor 130. A specific example of the operation interface 150 will be described later.

The controller 135 collectively controls a whole operation of the digital camera 100. The controller 135 includes a central processing unit (CPU) or the like, and the CPU executes a program (software) to realize predetermined functions. For example, controller 135 includes, as a functional configuration, a file system controller 136 that controls writing of data to a memory card 200 in conformity with a predetermined file system. Alternatively, the controller 135 may include a processor configured with a dedicated electronic circuit designed to realize predetermined functions. That is, the controller 135 can be realized by various processors such as a CPU, a microprocessor unit (MPU), a graphic processor unit (GPU), a digital signal processor (DSP), a field programmable gate array (FPGA), and an application specific integrated circuit (ASIC). The controller 135 may be configured with one or more processors. The controller 135 may be configured with one semiconductor chip together with the image processing engine 120 or other elements.

The buffer memory 125 is an example of a volatile storage functioning as a working memory for the image processing engine 120 and the controller 135. The buffer memory 125 is realized by a dynamic random access memory (DRAM) or other components. The flash memory 145 is a non-volatile storage medium and stores various programs and the like. Further, not shown in the drawings, the controller 135 may include various internal memories and may incorporate a read-only memory (ROM), for example. The ROM stores various programs to be executed by the controller 135.

Further, the controller 135 may incorporate a random access memory (RAM) (an example of the memory) functioning as a, working area for the CPU.

The card slot 140 is a means by which a detachable memory card 200 is inserted. The memory card 200 can be electrically and mechanically connected to the card slot 140. The card slot 140 is an example of a recorder in the present embodiment.

The memory card 200 is an external memory incorporating a recording device such as a flash memory. The memory card 200 is an example of a non-volatile recording medium. The memory card 200 can store data such as image data generated by the image processing engine 120. The memory card 200 is, e.g., a compact flash (CF) express card, a secure data (SD) express card, a secure data (SD) card or an XQD card, and has a predetermined read and writing speed (e.g., 1 GB/second or more).

Figure 2:
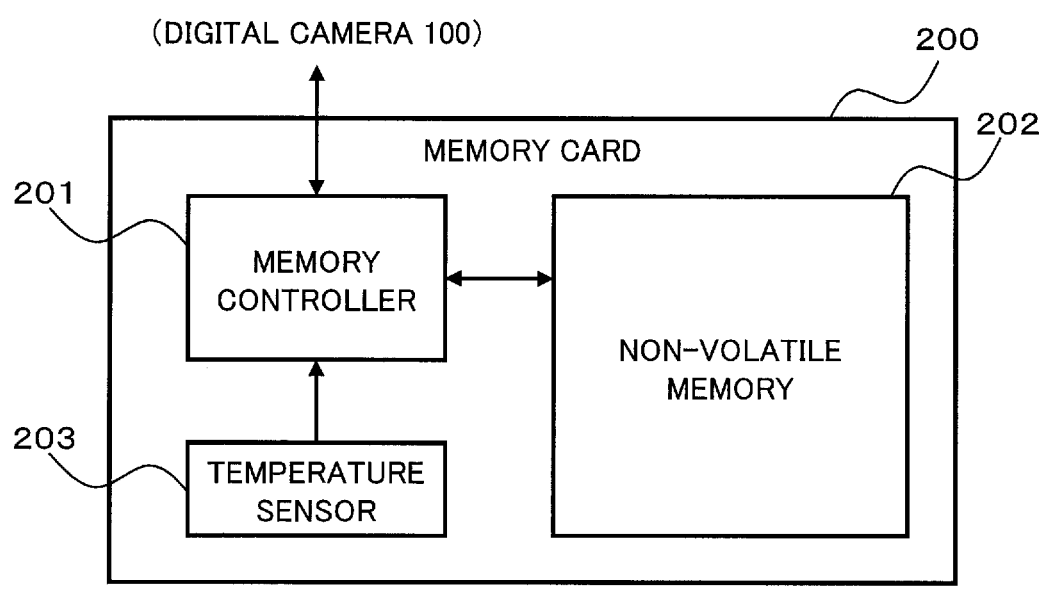
FIG. 2 is a diagram exemplifying a configuration of a memory card used in the digital camera.

FIG. 2 exemplifies a configuration of the memory card 200. For example, the memory card 200 includes: a memory controller 201 that controls the entire operation of the memory card 200; a non-volatile memory 202 serving as a recording device; and a temperature sensor 203 that measures a temperature of the memory card 200.

For example, the memory controller 201 includes: a CPU or an MPU; and an interface module (circuit) for communicating data with the digital camera 100. The memory controller 201 receives an access from the controller 135 of the digital camera 100 via the card slot 140 and controls writing and reading of data to and from the non-volatile memory 202.

The temperature sensor 203 is e.g., a thermistor or the like, and outputs, to the memory controller 201, a sensor signal indicating a measured value of the temperature of the memory card 200. Based on the sensor signal from the temperature sensor 203, the memory controller 201 controls the writing speed and the like of data according to the temperature of the memory card 200.

Furthermore, the digital camera 100 (FIG. 1) is also appropriately provided with not-shown temperature sensors to measure the temperature of some parts. The parts to be measured are, e.g., the image sensor 115, the image processing engine 120, a rear face part, and the like. Sensor signals indicating measurement results of temperature by the temperature sensors are input to the controller 135.

The Wi-Fi module 160 in the digital camera 100 (FIG. 1) is a communication module (circuit) that performs communication in conformity with the communication standard IEEE 802.11, the Wi-Fi standard, or the like. The digital camera 100 can communicate with other devices having a Wi-Fi module, via the Wi-Fi module 160. The Wi-Fi module 160 is an example of a transmitter in the present embodiment. The digital camera 100 may directly communicate with other devices via the Wi-Fi module 160, or may communicate via an access point, and can connect to a communication network such as the internet. Note that, instead of a Wi-Fi module, a communication module that performs communication in conformity with another communication standard may be used.

1-1. Operation Interface

Figure 3:
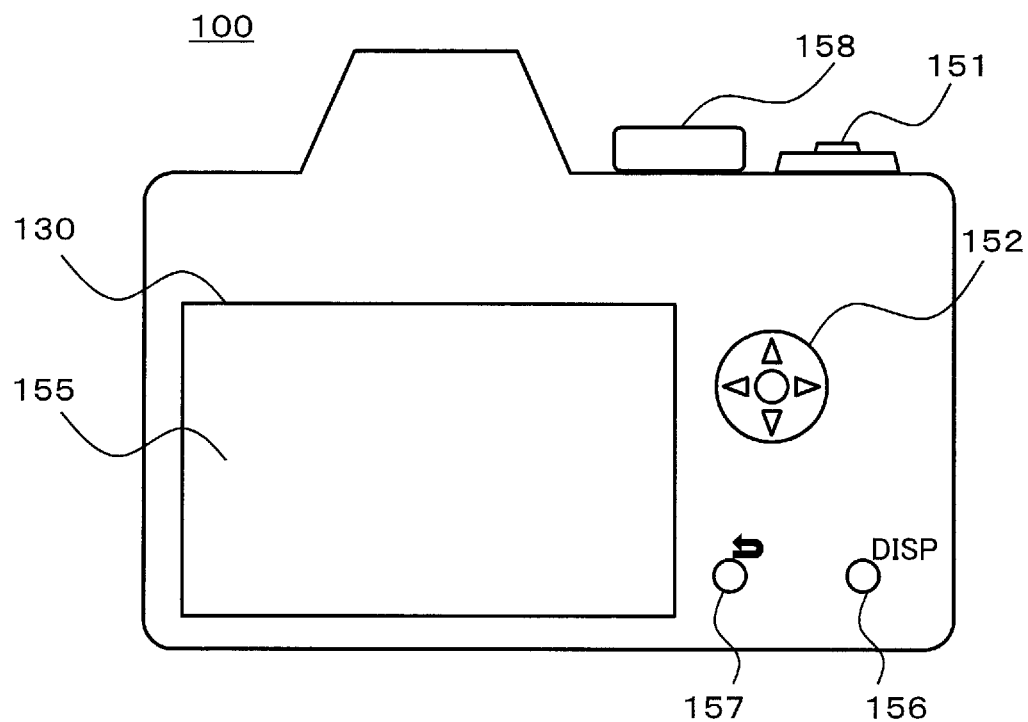
FIG. 3 is a diagram showing a rear face of the digital camera.

A specific example of the operation interface 150 in the digital camera 100 will be described with reference to FIG. 3. FIG. 3 is a view illustrating a rear face of the digital camera 100.

FIG. 3 illustrates, as an example of the operation interface 150, a release button 151, a selection button 152, a touch panel 155, a plurality of push buttons 156 and 157, and a dial 158. In response to receiving a user operation, the operation interface 150 transmits to the controller 135 an operation signal corresponding to the user operation.

The release button 151 is a two-stage press button. When the release button 151 is half-pressed by a user, the controller 135 performs an autofocus control (AF control), an auto exposure control (AE control), and the like. In addition, when the release button 151 is fully pressed by the user, the controller 135 records image data captured at the timing of the press-down operation, in the memory card 200 or the like as a recorded image.

The selection button 152 includes press buttons provided in the up, down, left, and right directions and a press button provided at the center. By pressing down the selection button 152 in any one of the directions, the user can select various condition items displayed on the display monitor 130 or can move a cursor. When the user presses down a center button of selection button 152 while digital camera 1 is in an image shooting mode or a reproduction mode, the controller 135 displays a menu screen on the display monitor 130. The menu screen is a screen for setting various conditions for imaging and reproduction. When the center button is pressed while an item for setting various conditions is selected, the setting of the selected item is determined by the controller 135.

The touch panel 155 is disposed to overlap a display screen of the display monitor 130, and detects a touch operation on the display screen by a user's finger. As a result, the user can perform operations such as designation of an area for the image displayed on the display monitor 130 and various selections on the menu screen.

The dial 158 is a rotary operation interface. The dial 158 can be used to set various modes of the digital camera 100.

2. Operation

A description will be given on the operation of the digital camera 100 configured as described above. Hereinafter, the operation at shooting a moving image by the digital camera 100 will be described. The moving image shooting operation is started and ended in accordance with a user operation on the operation interface 150.

The digital camera 100 captures, with the image sensor 115, a subject image formed via the optical system 110 and generates image-capturing data, sequentially with a predetermined cycle such as a frame cycle of a moving image. For example, the controller 135 causes the image processing engine 120 to perform various processes on the image-capturing data generated by the image sensor 115, thereby generating image data for recording, and stores the image data in the buffer memory 125.

The controller 135 performs recording of the moving image by controlling to sequentially write the held image data to the memory card 200 via the card slot 140 in image capturing by the image sensor 115. For example, in each frame cycle, the controller 135 causes the file system controller 136 to transmit a write command via the card slot 140 to the memory controller 201. In response to the command received from the digital camera 100, the memory controller 201 writes the image data for recording to the non-volatile memory 202 of the memory card 200, and transmits a command for notifying completion of writing to the controller 135.

In the moving image shooting operation as described above, the recording of image data in the memory card 200 may be automatically stopped due to the writing speed that cannot be kept higher than the generation speed of image data. The writing speed of the memory card 200 can decrease when the temperature becomes high. An example of a countermeasure against such a case is warning method that a warning display such as an indicator is presented to the user in response to detection of a writing speed or a temperature at which recording is stopped in shooting of a moving image.

However, by the warning method as described above, the recording of the moving image is stopped immediately after the warning display is presented. Thus, it is difficult for the user to test countermeasures or the like using various ingenuities to avoid stop of the recording. Also, there is a problem that the user is difficult to see how much time is left before the recording of the moving image is stopped. To address these issues, the digital camera 100 of the present embodiment provides a display function that visualizes, as needed, temporal changes of various parameters (i.e., factor parameters) that can be factors to hinder the moving image shooting operation.

2-1. Factor Graph

The display function of factor parameters in the digital camera 100 of the present embodiment will be described with reference to FIG. 4.

Figure 4:
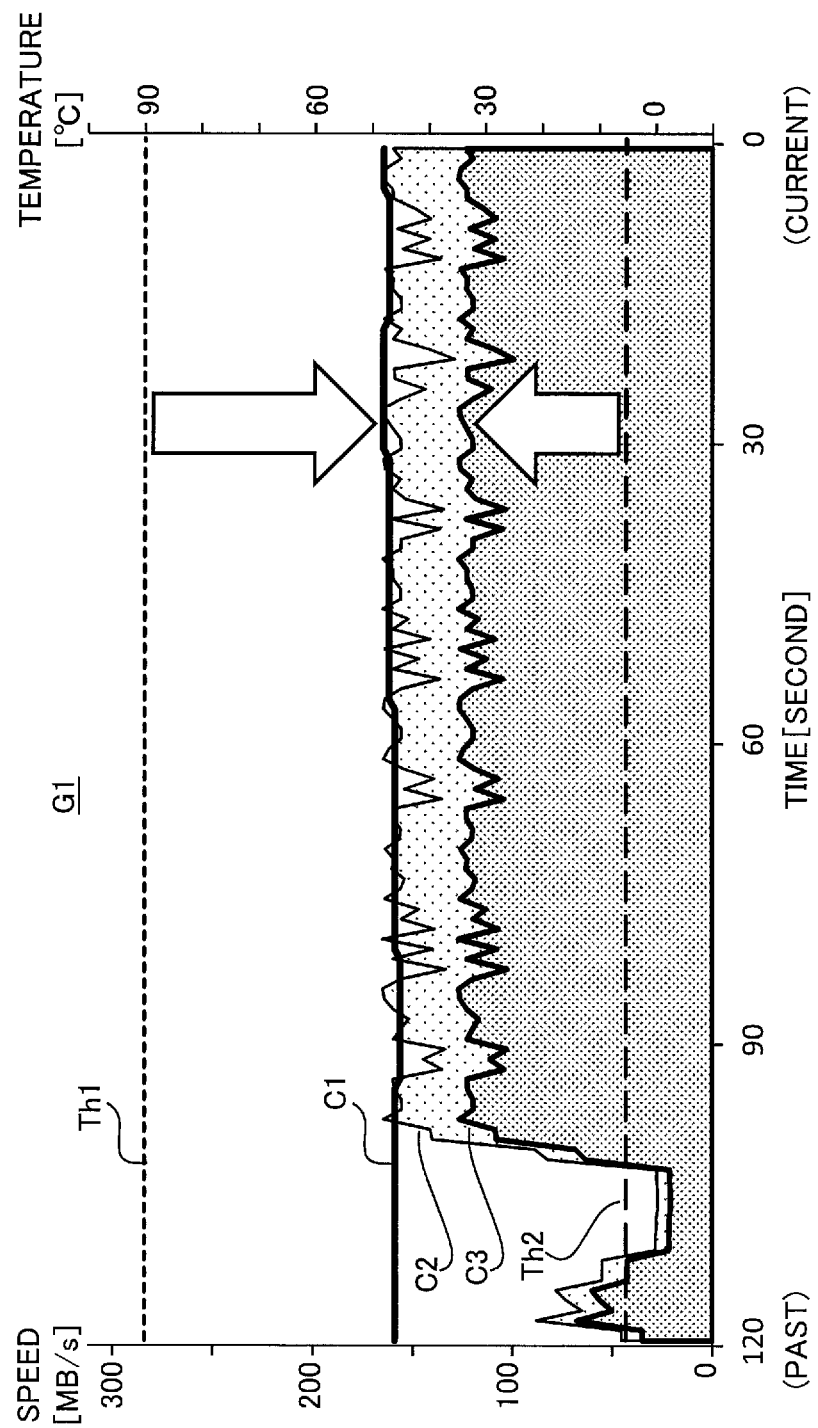
FIG. 4 is a diagram illustrating a display example of a factor graph in the digital camera.

FIG. 4 illustrates a display example of a factor graph G1 in the digital camera 100 according to the present embodiment. The digital camera 100 according to the present embodiment has a function to display a graph that visually represents real-time measured values corresponding to the various factor parameters that can hinder a moving image shooting operation. That is, the digital camera 100 has a function of displaying the factor graph G1.

The horizontal axis of the factor graph G1 illustrated as an example in FIG. 4 is a time axis indicating past time in unit of second [s], for example. For example, the right-side end in the figure is the current time point, and the time goes back to the past toward the left side in the drawing. In this example of the factor graph G1, a temperature [° C.] is indicated by the vertical axis on the right side, and a writing speed [MB/s] is indicated by the vertical axis on the left side.

The factor graph G1 of the example of FIG. 4 includes: a measurement curve C1 and a reference line Th1 for a card temperature; a measurement curve C2 for a card speed; a measurement curve C3 and a boundary line Th2 for a writing speed. In the factor graph G1 of the present embodiment, the various measurement curves C1 to C3 sequentially indicate the measured values of their corresponding factor parameters in time series at the measurement time points.

The measurement curve C1 of the card temperature represents the measured value of the temperature of the memory card 200 (i.e., the card temperature) measured by the temperature sensor 203, for example. The measurement curve C2 of the card speed represents the measured value of the writing-speed (i.e., the card speed) of the image data in the memory card 200. The measurement curve C3 of the writing speed represents the measured value of the overall writing speed of the recording operation to write image data in the memory card 200, where the writing speed includes the control of the file system in the digital camera 100.

The reference line Th1 of the card temperature indicates a reference temperature at which the stop of the moving image should be cautioned when the temperature of the memory card 200 becomes high, for example. The reference line Th2 of the writing speed indicates a reference writing speed at which the stop of the moving image should be cautioned when the overall writing speed of the recording operation becomes low, for example. The reference line Th2 does not have to be particularly compared with the measurement curve C3 of the writing speed, but may be compared with the measurement curve C2 of the card speed.

The digital camera 100 according to the present embodiment displays the various measurement curves C1 to C3 with updating the measurement curves C1 to C3 sequentially so that the ever-changing measured values of the factor parameters, such as the temperature of the memory card 200 and the various writing speeds, are visualized in real time, as in the factor graph G1 illustrated in FIG. 4. Viewing how much the measurement curve C1 of the card temperature falls below the reference line Th1 and how much the measurement curves C2 and C3 of various speeds exceed the reference line Th2 enables the user to check in real time how much margin is remained until the moving image recording is stopped.

In a conceivable case, when the user finds that the card temperature is high by checking the factor graph G1, the user may want to try a countermeasure to resolve the high temperature state. Depending on the image shooting situation of the user, the countermeasure may include various ways, such as cooling the digital camera 100 from outside, and providing a shade in the place where the image shooting is performed. In such a case, with the factor graph G1 of the present embodiment, the user can check the effect of a desired countermeasure under test by viewing the change in the measurement curve C1 of the card temperature in the factor graph G1 while testing the countermeasure.

For example, when the card temperature is decreasing from the above case, the user can see whether the writing speed has been ensured, by checking the changes of the measurement curves C2 and C3 of the various speeds. Furthermore, in the case where the user tries various memory cards 200 or tries various image shooting modes, it is possible to facilitate, by checking the factor graph G1, pre-study of an appropriate memory card 200 or an image shooting mode that does not cause stop of recording of a moving image.

2-2. Display Operation of Factor Graph

Figure 5:
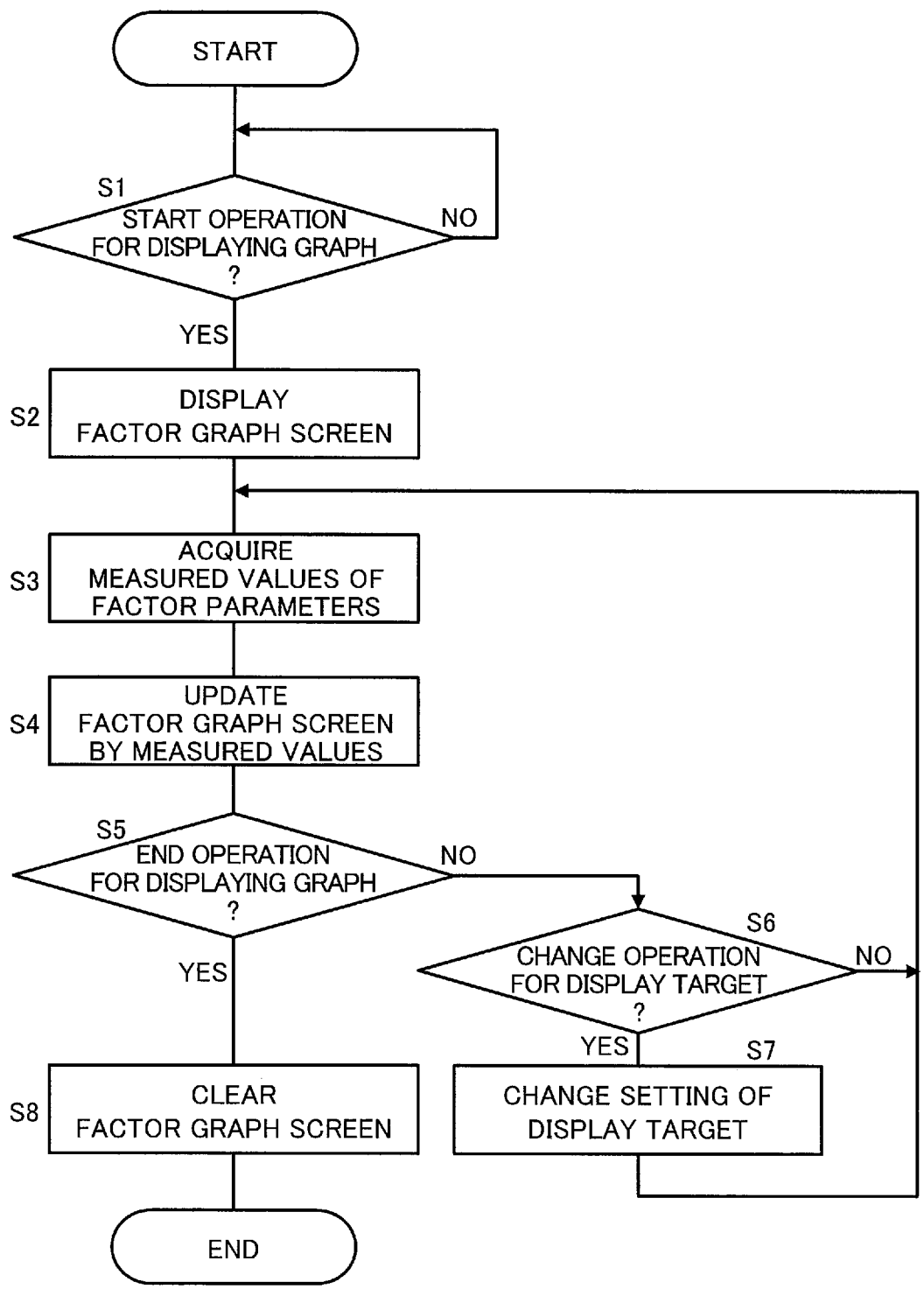
FIG. 5 is a flowchart for describing a display operation of a factor graph in the digital camera.
Figure 6:
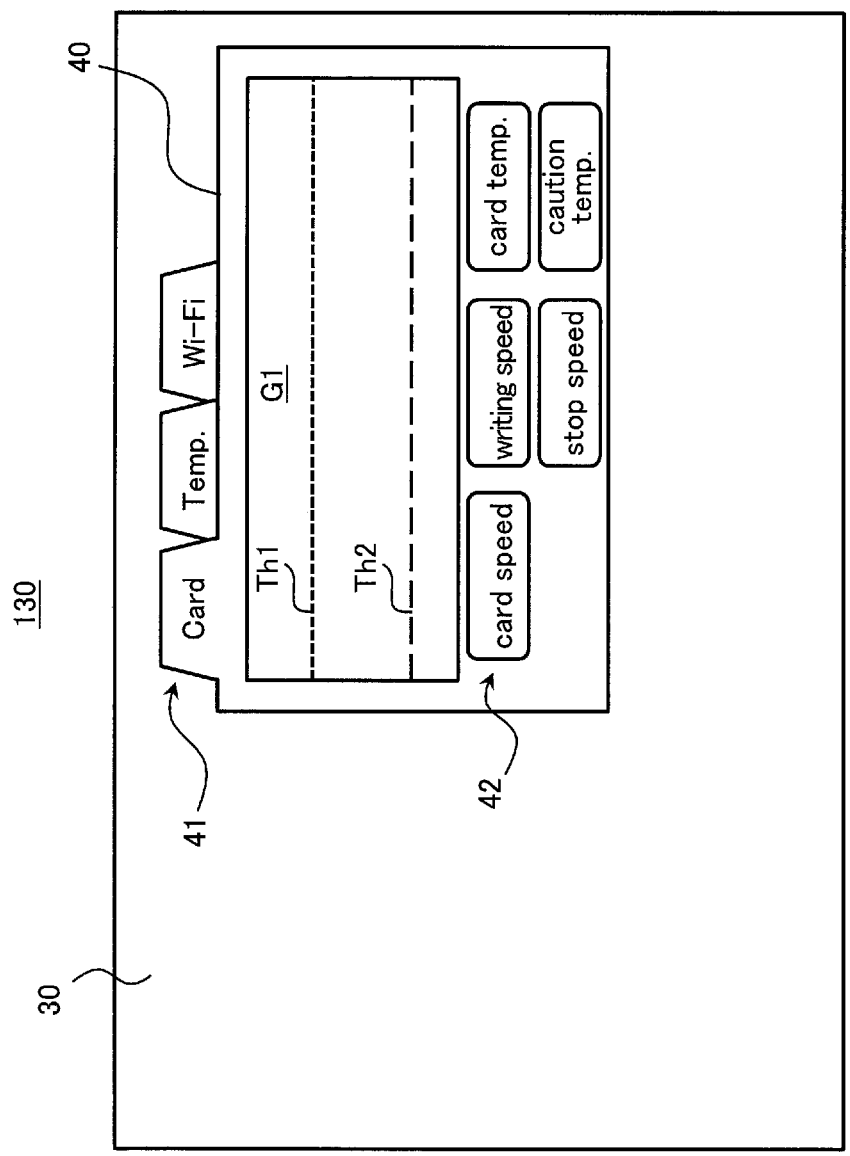
FIG. 6 is a diagram for describing a factor graph screen in the digital camera.
Figure 7:
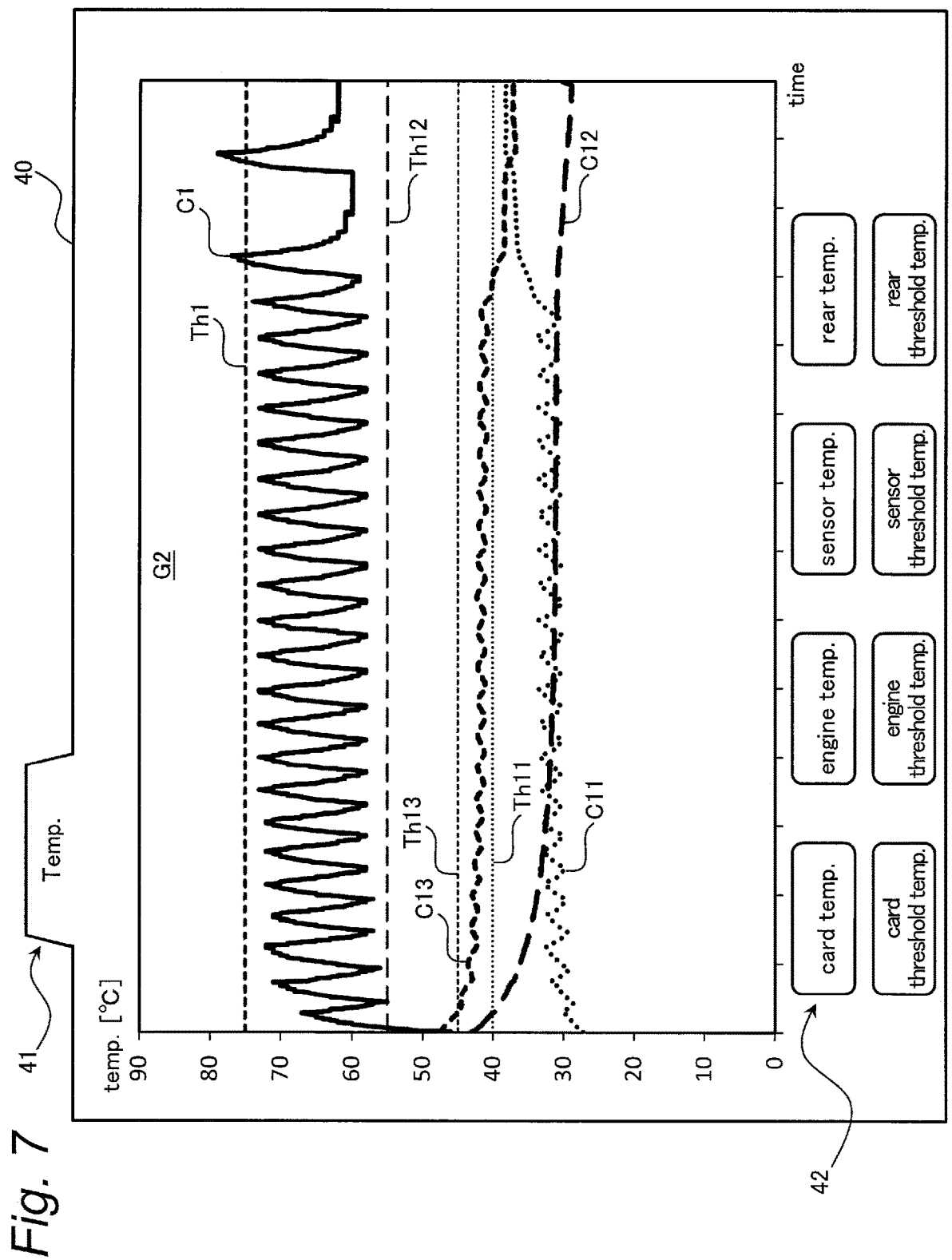
FIG. 7 is a diagram illustrating another example of the factor graph screen in the digital camera.

With reference to FIGS. 5 to 7, a description will be given on an operation of the digital camera 100 that displays the factor graph G1 as described above. FIG. 5 is a flowchart for describing a display operation of the factor graph in the digital camera 100.

For example, the process illustrated in the flowchart of FIG. 5 is started at the time of a moving image shooting operation, and is executed by the controller 135 in parallel with the moving image shooting operation. The process illustrated in this flow is started in the state where setting information such as the reference values with respect to the various factor parameters is in advance stored in the flash memory 145 of the digital camera 100.

At first, the controller 135 receives a predetermined user operation for starting display of the factor graph G1 on the operation interface 150 (step S1). The start operation for displaying the graph is set in advance to a predetermined user operation such as a press-down operation of the push button 156.

When the start operation for displaying the graph is input (step S1), the controller 135 controls the display monitor 130 to display a screen for displaying the factor graph G1 (step S2). A display example of the display monitor 130 in step S2 is illustrated in FIG. 6.

For example, as illustrated in FIG. 6, the controller 135 causes the display monitor 130 to display a factor graph screen 40 by superimposing the factor graph screen 40 on an image shooting screen (live view screen) 30 for a moving image (step S2). In the present embodiment, the factor graph screen 40 is configured such that the display targets can be switched for facilitating to see various factor parameters. The factor graph screen 40 includes: an area in which the factor graph G1 is displayed; classification tabs 41; and item buttons 42.

The classification tabs 41 are tabs into which the factor parameters are classified as items to be displayed on the factor graph screen 40. For example, the classification tab 41 of "Card" indicates the classification whose display items are the factor parameters for the memory card 200, and the classification tab 41 of "Card" corresponds to the example of FIG. 4. By switching the classification tabs 41, the factor parameter for each classification can be displayed.

The item buttons 42 are buttons for individually switching whether each display item is a display target or not, on each classification tab 41. The factor graph screen 40 in FIG. 6 includes, on the classification tab 41 of "Card", item buttons 42 for the measured values and the reference values of the various factor parameters illustrated as examples in FIG. 4. Specifically, when all the item buttons 42 in FIG. 6 are set as display targets, the factor graph G1 illustrated in FIG. 4 is displayed in the display area of the factor graph G1 on the factor graph screen 40.

In step S2, referring to the setting information of the factor parameters stored in the flash memory 145 in advance, the controller 135 displays each of the reference lines Th1 and Th2 on the factor graph screen 40, for example (FIG. 6). At the time of step S2, the measured values particularly before the current time are not acquired, and the measurement curves C1 to C3 of the various factor parameters are not yet displayed.

Next, the controller 135 acquires the measured values of the various factor parameters at the current time point (step S3). In step S3, the measured values of the factor parameters set as display targets on the classification tab 41 by the item buttons 42 are acquired, for example.

In step S3, the controller 135 acquires the card temperature measured by the temperature sensor 203 and the card speed measured by the memory controller 201, from the memory controller 201 via the card slot 140, for example. For example, the controller 135 causes, the file system controller 136 to measure the writing speed, including the control of the file system, while writing the image data.

Next, based on the acquired measured value, the controller 135 controls the display monitor 130 such that the display monitor 130 updates and displays the measurement curves C1 to C3 of the factor parameters as display targets, on the factor graph screen 40 (step S4).

Further, in the state where the factor graph screen 40 is displayed, the controller 135 receives, on the operation interface 150, various user operations such as an end operation for displaying the graph (step S5) and a changing operation for the display target (step S6). The end operation for displaying the graph is a user operation for ending the display of the factor graph G1, and is preset to a press-down operation of the push button 157 or the like. The changing operation for the display target includes various user operations for changing the factor parameters of display targets on the factor graph screen 40, and includes, e.g., a touch operation of the classification tabs 41 and the item buttons 42.

In particular, when the above user operations are not input (steps S5 and S6: NO), the controller 135 repeats the process in step S3 and the following processes on a predetermined cycle (e.g., 10 seconds). As a result, the measurement curves C1 to C3 of the factor parameters as display targets are sequentially updated and displayed to include the current measured values on the factor graph screen 40. As a result, the factor graph G1 as illustrated as an example in FIG. 4 is dynamically displayed on the factor graph screen 40 in FIG. 6.

On the other hand, when the changing operation for the display target is input (step S6: YES), the controller 135 changes the display targets on the factor graph screen 40 according to the user operation (step S7). By the operation for changing display targets, the user can reassign the factor graph screen 40 to the display item of the classification tabs 41 that the user desires to display. Also, the user can remove some of the display items on the selected classification tab 41, from display targets by using the item buttons 42. The controller 135 acquires the measured value of the factor parameter for the changed display target in the same manner as described above (step S3), and updates the display of the factor graph screen 40 (step S4).

When the end operation for displaying the graph is input (step S5: YES), the controller 135 clears the display of the factor graph screen 40 on the display monitor 130 (step S8), to end the process illustrated in the present flowchart.

According to the above process, the digital camera 100 displays the measured values of the factor parameters desired by the user, on the factor graph screen 40 in real time according to the user operation (steps S1 to S8). Consequently, especially before shooting of a moving image is hindered, various factor parameters can be visualized for the user. In addition, by using the classification tabs 41 and the item buttons 42 on the factor graph screen 40, it is possible to switch display targets from the various factor parameters in response to the user operation, and to facilitate visualization of the factor parameters.

In the above description, the display example of the classification tab 41 of "Card" has been described. However, the classification of the factor parameters is not limited to "Card", and various classifications can be applied. As an example of such cases, the case where the classification of the factor parameter is "Temperature" will be described with reference to FIG. 7.

FIG. 7 illustrates a display example of the factor graph screen 40 in the case where the classification tab 41 of "Temperature" is selected. On the classification tab 41 of "Temperature", the factor parameter indicating the temperature of some part in the digital camera 100 is classified into a display item. On the factor graph screen 40 illustrated as an example in FIG. 7, the factor graph G2 includes, in addition to the measurement curve C1 and the reference line Th1 of the card temperature, a measurement curve C11 and a reference line Th11 of an engine temperature, a measurement curve C12 and a reference line Th12 of a sensor temperature, and a measurement curve C13 and a reference line Th13 of a rear temperature.

The measurement curve C11 of the engine temperature indicates a measured value of the temperature of the image processing engine 120 in the digital camera 100. The reference line Th11 indicates a reference value set with respect to an increased temperature of the image processing engine 120. The measurement curve C12 of the sensor temperature indicates the measured value of the temperature of the image sensor 115. The reference line Th12 indicates the reference value with respect to an increased temperature of the image sensor 115. The measurement curve C13 of the rear temperature indicates the measured value of the temperature of a rear face part of the digital camera 100. The reference line Th12 indicates the reference value with respect to an increased temperature of the rear face part. The temperature of each part described above is an example of the factor parameter that can hinder the image shooting operation of the digital camera 100.

With the factor graph G2 of the classification "Temperature" as described above, it can be visualized for the user which part of the digital camera 100 is heated high enough to put the digital camera 100 in a state where an image shooting operation can be hindered. In addition, by using the item buttons 42, it is possible to individually switch between displaying and hiding the various measurement curves C1 to C13 and the reference lines Th1 to Th13 in the same way as described above.

3. Summary

As described above, the digital camera 100 of an example of the imaging apparatus in the present embodiment includes the image sensor 115 (image sensor), the card slot 140 (recorder), the controller 135 (controller), and the display monitor 130 (display interface). The image sensor 115 captures a subject image to generate image data. The card slot 140 records the image data into a memory card 200 (recording medium). The controller 135 controls a moving image shooting operation in which the image data indicating a moving image is recorded in the memory card 200 by the card slot 140 on the basis of a result of imaging by the image sensor 115. The display monitor 130 (display) sequentially displays, as a factor graph G1, the measured value (C1 to C13) of at least one parameter (in other words, a factor parameter) indicating a factor that hinders the moving image shooting operation, at every measurement time.

With the digital camera 100 described above, by displaying the factor graph G1 sequentially including the measured values of the various factor parameters, it is possible to facilitate the user to chack the factor that may hinder shooting of the moving image.

The digital camera 100 of the present embodiment further includes an operation interface 150 (operation interface) that receives a user operation for displaying a measured value of the parameter on the display monitor 130. As a result, particularly before the moving image shooting operation is hindered, the user can display, as needed, the measured value of the factor parameter and can easily check the factor that may hinder image shooting.

In the digital camera 100 according to the present embodiment, the factor parameters include a plurality of parameters each indicating one of a plurality of factors that are different from each other to hinder the moving image shooting operation. The operation interface 150 receives a user operation for switching the parameters, among a plurality of factor parameters, to be displayed on the display monitor 130 by using the classification tabs 41 and the item buttons 42, for example. Consequently, it is possible to selectively display, from various factor parameters, the factor parameter that the user wants to check, and it is therefore possible for the user to easily check the factor that may hinder image shooting.

In the digital camera 100 of the present embodiment, the display monitor 130 displays a predetermined reference value (Th1 to Th13) with respect to at least one parameter together with a measured value of the parameter. According to this, the user can see, from the difference between the measured value of the factor parameter and the reference value, how much margin there is until image shooting will be hindered.

In the digital camera 100 of the present embodiment, the factor parameter includes at least one of a card speed (first writing speed) at which image data is written to the memory card 200 or a writing speed (second writing speed) at which writing of image data from the digital camera 100 to the memory card 200 is controlled (see FIG. 4). The reference value corresponding to the reference line Th2 represents a threshold in which, when the first or second writing speed is lower than the reference value, a moving image shooting operation is hindered. The user can see how much margin there is until recording of a moving image is stopped, on the basis of how much the measured value of the writing speed exceeds the reference value.

In the digital camera 100 of the present embodiment, the factor parameters include at least one of a card temperature (first temperature) of the memory card 200 or a temperature (second temperature) of each part of the digital camera 100 (see FIG. 7). The reference values corresponding to the reference lines Th1 and Th11 to Th13 each represent a threshold in which, when the first or second temperature is higher than the reference value, a moving image shooting operation is hindered. The user can see how much margin there is until an image capturing operation is stopped, on the basis of how much the measured values of the various temperatures fall below their respective reference values.

In the digital camera 100 of the present embodiment, the display monitor 130 displays the factor graph G1 or G2 that is a graph indicating the measured values of the factor parameters with respect to a past time axis. With the factor graph G1 or G2, the user can intuitively check temporal changes of the various factor parameters, and can therefore easily recognize the factor that hinders image capturing.

In the digital camera 100 of the present embodiment, the memory card 200 is a memory card having a writing speed that changes depending on the temperature. For example, when the memory card 200 such as a CF express card is used, it is presumed that the writing speed can precipitously change due to a temperature change. Even in such a case, with the digital camera 100 of the present embodiment, it is easy for the user to check the factor that may hinder image shooting, and it is therefore possible to easily perform shooting the moving image or the like.

Other Embodiments

The first embodiment has been described in the above as an example of the techniques disclosed in the present application. However, the techniques of the present disclosure can be applied not only to the above embodiment but also to an embodiment in which modification, replacement, addition, or removal is appropriately made. Further, it is possible to form a new embodiment by combining the components described in the above embodiment. Here, other embodiments will be exemplified below.

In the above first embodiment, an example has been described in which the digital camera 100 displays the factor graph G1 indicating the measured values of the factor parameters along the time axis. However, the factor parameters in the digital camera 100 do not have to be displayed on the factor graph G1. Such a modified example will be described with reference to FIG. 8.

Figure 8:
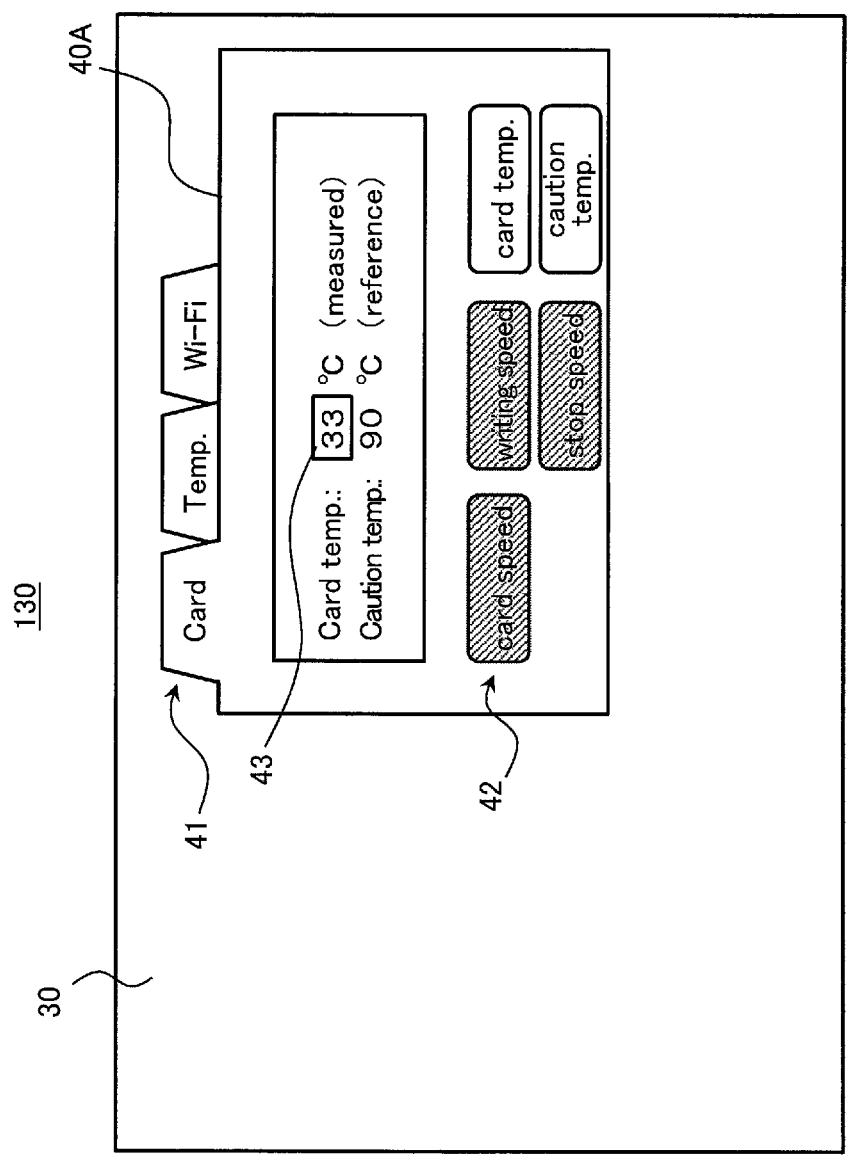
FIG. 8 is a diagram for describing a modified example of the digital camera.

FIG. 8 illustrates a display example of a factor parameter in the digital camera 100 of the modified example. In the present modified example, the digital camera 100 displays a factor parameter screen 40A instead of the factor graph screen 40 (FIG. 6) of the first embodiment. The digital camera 100 of the present embodiment may display the measured value of the factor parameter as a numerical value instead of the factor graph G1 as in the factor parameter screen 40A, for example. For example, every time the measured value of the factor parameter of a display target is obtained, the controller 135 sequentially displays the measured value by updating a numerical value field 43 of the measured value to the latest value. This makes it possible for the user to grasp the situation of the factor parameter in real time.

In the above embodiments, an example has been described in which the factor graph screen 40 is displayed in a superimposed manner on a live view screen 30. However, the factor graph screen does not particularly have to be displayed in a superimposed manner. In the present embodiment, the digital camera 100 may display the factor graph screen 40 as a dedicated screen different from the live view screen 30. In the above embodiments, an example has been described in which the factor graph G1 is displayed on the factor graph screen 40 including the classification tabs 41 and the item buttons 42. However, the classification tabs 41 and the item buttons 42 may be appropriately omitted.

In the above embodiments, a case where recording of a shot moving image shooting is hindered has been described. In the present embodiment, the display function of the factor parameter does not have to be applied particularly to recording of a shot moving image but may be applied to factors that hinder various image shooting operations. For example, at a time of an operation such as streaming in which moving image data is transmitted to an external device via the Wi-Fi module 160 with a moving image being shot by the digital camera 100, parameters for a communication state such as a radio field strength and a transfer speed are examples of the factor parameter that may hinder an image capturing operation. Therefore, with respect to the above factor parameters for the communication state, the digital camera 100 according to the present embodiment may display a measured value in a similar manner to the first embodiment. According to this, the user can consider a countermeasure such as performing an image shooting operation of the digital camera 100 after moving to a place where the communication state is improved.

As described above, in the present embodiment, the digital camera 100 (imaging apparatus) may include: the image sensor 115 (image sensor) that captures a subject image to generate image data; the Wi-Fi module 160 (output interface) that outputs the image data to an external device; the controller 135 that controls an image capturing operation in which the image data indicating a moving image based on a result of the imaging by the image sensor 115 is output from the output interface; and the display monitor 130 that displays a measured value of at least one parameter sequentially for each measurement time, the parameter indicating a factor that hinders the moving image shooting operation.

Also with the imaging apparatus described above, similarly to the first embodiment, it is possible to facilitate the user to check the factor that may hinder shooting of the moving image. The output interface in the imaging apparatus is not particularly limited to the Wi-Fi module 160, and may be various communication modules that perform data communication according to various communication standards. Alternatively, the output interface may be a recorder that records image data on a recording medium, as an external device.

In the above embodiments, the memory card 200 exemplifies the recording medium, and the card slot 140 exemplifies the recorder of the digital camera 100, but the recorder is not limited thereto. In the present embodiment, the recording medium is not limited to a memory card, and may be an external storage device such as a solid state disk (SSD) drive, for example. The recorder in this case may be various interface circuits that perform data writing from the digital camera 100 to the external storage device.

In the above embodiments, the display monitor 130 is described as an example of the display interface. The display interface of the present embodiment is not limited to the display monitor 130, and may be, e.g., an electronic view finder (EVF), an output module that outputs a video signal according to the HDMI (registered trademark) standard, or the like.

In the above embodiments, the digital camera 100 including the optical system 110 and the driver 112 is exemplified. The imaging apparatus of the present embodiment does not have to include the optical system 110 or the driver 112, and may be an interchangeable lens camera, for example.

In the above embodiments, a digital camera is described as an example of the imaging apparatus, but the imaging apparatus is not limited to the digital camera. The imaging apparatus of the present disclosure may be and electronic device having an image capturing function (e.g., a video camera, a smartphone, and a tablet terminal).

In the above, the embodiments are described as examples of the techniques in the present disclosure. For that purpose, the accompanying drawings and the detailed description are provided.

Therefore, the components illustrated in the accompanying drawings and described in the detailed description not only include components essential for solving the problem but also can include, to exemplify the techniques, components that are not essential for solving the problem. For this reason, it should not be immediately recognized that those unnecessary components are necessary only because those unnecessary components are described in the accompanying drawings or the detailed description.

Since the embodiments described above are merely examples of the techniques in the present disclosure, various modifications, replacements, additions, omissions, and the like can be made in the scope of the claims or in an equivalent scope thereof.

The present disclosure is applicable to various imaging apparatuses that perform a moving image shooting operation or the like.

The invention claimed is:

1. An imaging apparatus comprising:
   an image sensor that captures a subject image to generate image data;
   a recorder that records the image data into a recording medium;
   a controller that controls a moving image shooting operation in which the image data indicating a moving image based on a result of imaging by the image sensor is recorded into the recording medium by the recorder; and
   a display interface that enables to display a measured value of at least one parameter sequentially for each measurement time, the parameter indicating a factor that hinders the moving image shooting operation.

2. The imaging apparatus according to claim 1, further comprising an operation interface that responds to a user operation to display the measured value of the at least one parameter by the display interface.

3. The imaging apparatus according to claim 2, wherein the at least one parameter includes a plurality of parameters each indicating one of a plurality of factors that are different from each other to hinder the moving image shooting operation, and
   the operation interface responds to a user operation to switch a parameter that is to be displayed by the display interface, among the plurality of parameters.

4. The imaging apparatus according to claim 1, wherein the display interface displays a predetermined reference value with respect to the at least one parameter together with the measured value of the parameter.

5. The imaging apparatus according to claim 4,
   wherein the parameter includes at least one of a first writing speed or second writing speed, the first writing speed being a speed to write the image data in the recording medium, the second writing speed being a speed to control writing of the image data from the imaging apparatus to the recording medium, and
   wherein the reference value indicates a threshold for the moving image shooting operation to be hindered when the first writing speed or the second writing speed is lower than the reference value.

6. The imaging apparatus according to claim 4,
   wherein the parameter includes at least one of a first temperature or a second temperature, the first temperature being a temperature in the recording medium, the second temperature being a temperature in the imaging apparatus, and
   wherein the reference value indicates a threshold for the moving image shooting operation to be hindered when the first temperature or the second temperature is higher than the reference value.

7. The imaging apparatus according to claim 1, wherein the display interface displays a graph showing the measured value of the parameter with respect to a past time axis.

8. The imaging apparatus according to claim 1, wherein the recording medium is a memory card having writing speed that changes depending on a temperature.

9. An imaging apparatus comprising:
   an image sensor that captures a subject image to generate image data;
   an output interface that outputs the image data to an external device;
   a controller that controls a moving image shooting operation in which the image data indicating a moving image based on a result of imaging by the image sensor is output from the output interface; and
   a display interface that enables to display a measured value of at least one parameter sequentially for each measurement time, the parameter indicating a factor that hinders the moving image shooting operation.

* * * * *